United States Patent
Videtich

(10) Patent No.: US 8,131,211 B2
(45) Date of Patent: Mar. 6, 2012

(54) XM RADIO SATELLITE RECEPTION WITHOUT DEGRADING COVERAGE IN XM TERRESTRIAL MARKETS

(75) Inventor: Matt C. Videtich, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 1004 days.

(21) Appl. No.: 12/060,234

(22) Filed: Mar. 31, 2008

(65) Prior Publication Data

US 2009/0247073 A1 Oct. 1, 2009

(51) Int. Cl.
*H04B 7/185* (2006.01)
*H04L 27/08* (2006.01)

(52) U.S. Cl. ....... 455/12.1; 455/429; 455/13.1; 455/446

(58) Field of Classification Search ............... 455/427, 455/12.1, 13.2, 3.02, 13.1, 13.3, 13.4, 426, 455/428, 429, 430, 517, 11.1, 446, 452.1
See application file for complete search history.

(56) References Cited

U.S. PATENT DOCUMENTS

| 2005/0260948 A1* | 11/2005 | Regulinski et al. | 455/12.1 |
| 2010/0015971 A1* | 1/2010 | Good et al. | 455/427 |
| 2010/0048201 A1* | 2/2010 | Karabinis | 455/427 |

* cited by examiner

*Primary Examiner* — John J Lee
(74) *Attorney, Agent, or Firm* — Leydig, Voit & Mayer, Ltd.

(57) ABSTRACT

A system is provided for enhancing coverage for a mobile satellite service, the system comprising a signal threshold comparator module for monitoring a predetermined threshold for a satellite service signal received on a first frequency band, a signal gain block operable to vary amplification of the satellite service signal received on a second frequency band in response to the threshold, and a satellite receiver for decoding the satellite service signal received on the first and second frequency bands.

14 Claims, 4 Drawing Sheets

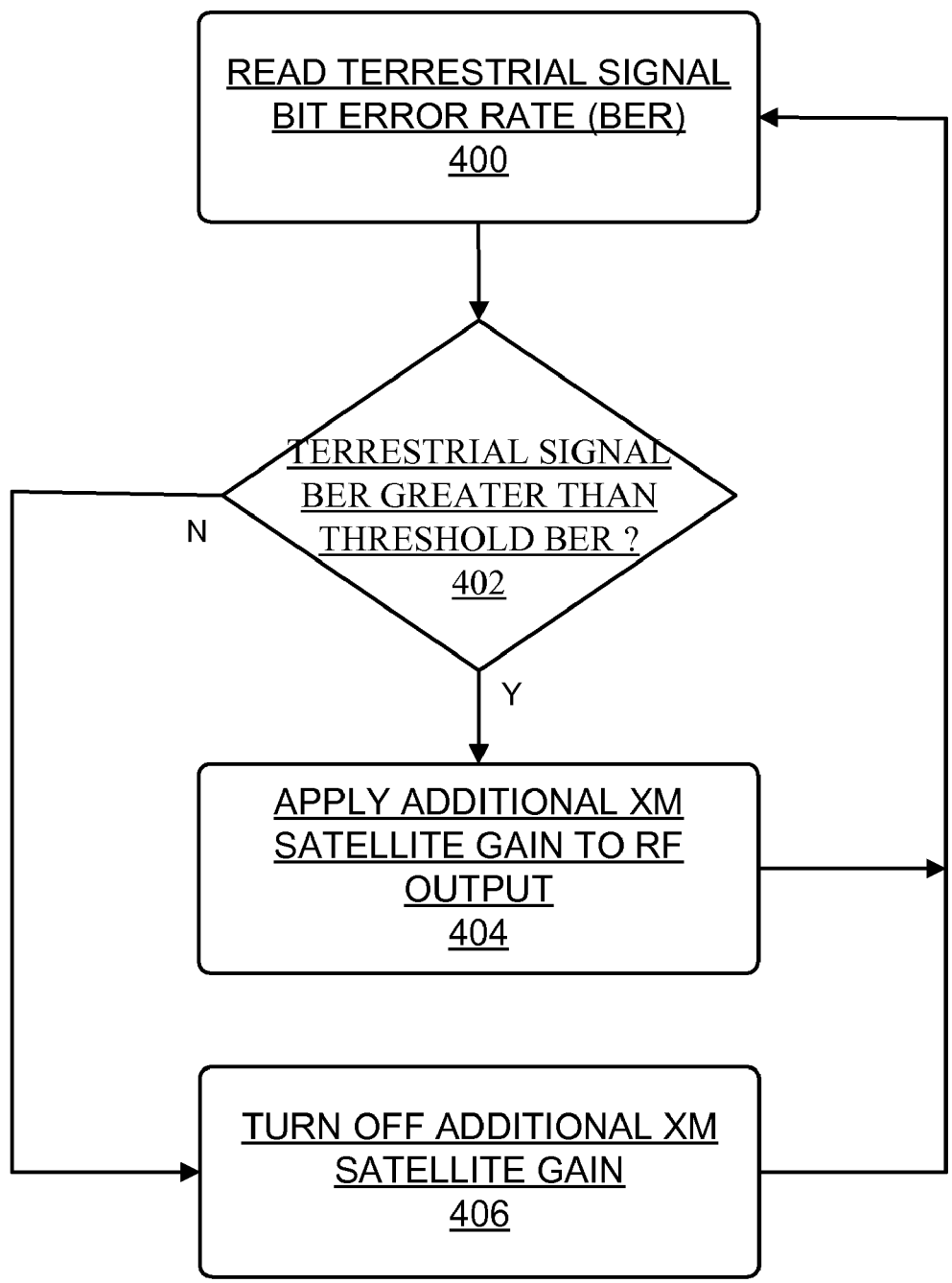

XM RADIO SATELLITE RECEPTION WITHOUT DEGRADING COVERAGE IN XM TERRESTRIAL MARKETS

FIELD OF THE INVENTION

This invention relates generally to the field of telematics and more specifically to the field of satellite radio reception.

BACKGROUND OF THE INVENTION

Mobile satellite services, including satellite radio services, employ a variety of techniques to supplement satellite based signal coverage. For example, since satellite based signal may degrade in high density/high rise building areas, the satellite radio services, such as XM and SIRIUS, employ a network of terrestrial repeaters that operate within the satellite radio service band to supplement satellite based coverage.

The XM satellite service band, for example, occupies 12.5 MHz of spectrum in the mid-2 GHz frequency range. The XM spectrum is split between satellite and terrestrial repeater operating bands. The frequency bands for the satellite and terrestrial signals are adjacent within the allocated 12.5 MHz of spectrum, thereby raising the need to control the possibility of adjacent channel interference between the satellite and terrestrial based signals at the receiver when the subscriber's vehicle travels from an area covered only by satellite signals to an area where both satellite and terrestrial coverage is available. The satellite band signal gain may be reduced to reduce the chances of the adjacent channel interference. However, this leads to a decreased service footprint in areas where only satellite coverage is available when satellite reception degrades due to dense foliage, for example. Therefore, a need exists for a mechanism to dynamically control the possibility of adjacent channel interference between satellite and terrestrial based signals while enhancing the satellite reception in areas not covered by the terrestrial repeater network.

BRIEF SUMMARY OF THE INVENTION

In one aspect of the invention, a system is provided for enhancing coverage for a mobile satellite service, the system comprising a signal threshold comparator module for monitoring a predetermined threshold for a satellite service signal received on a first frequency band, a signal gain block operable to vary amplification of the satellite service signal received on a second frequency band in response to the threshold, and a satellite receiver for decoding the satellite service signal received on the first and second frequency bands.

Preferably, the mobile satellite service is a radio satellite service and the threshold is a predetermined bit error rate of the satellite signal received on the first frequency band. In one example, the signal gain block (a) increases the amplification of the satellite service signal received on the second frequency band when a bit error rate of the satellite service signal received on the first frequency band is greater than the predetermined bit error rate, and (b) decreases the amplification of the satellite service signal received on the second frequency band when the bit error rate of the satellite service signal received on the first frequency band is lower than the predetermined bit error rate.

BRIEF DESCRIPTION OF THE DRAWINGS

FIG. 4 is a flow chart of a method for enhancing satellite coverage using the system of FIG. 3, in accordance with an example of the present invention.

DESCRIPTION OF AN EXEMPLARY EMBODIMENT

Figure 1:
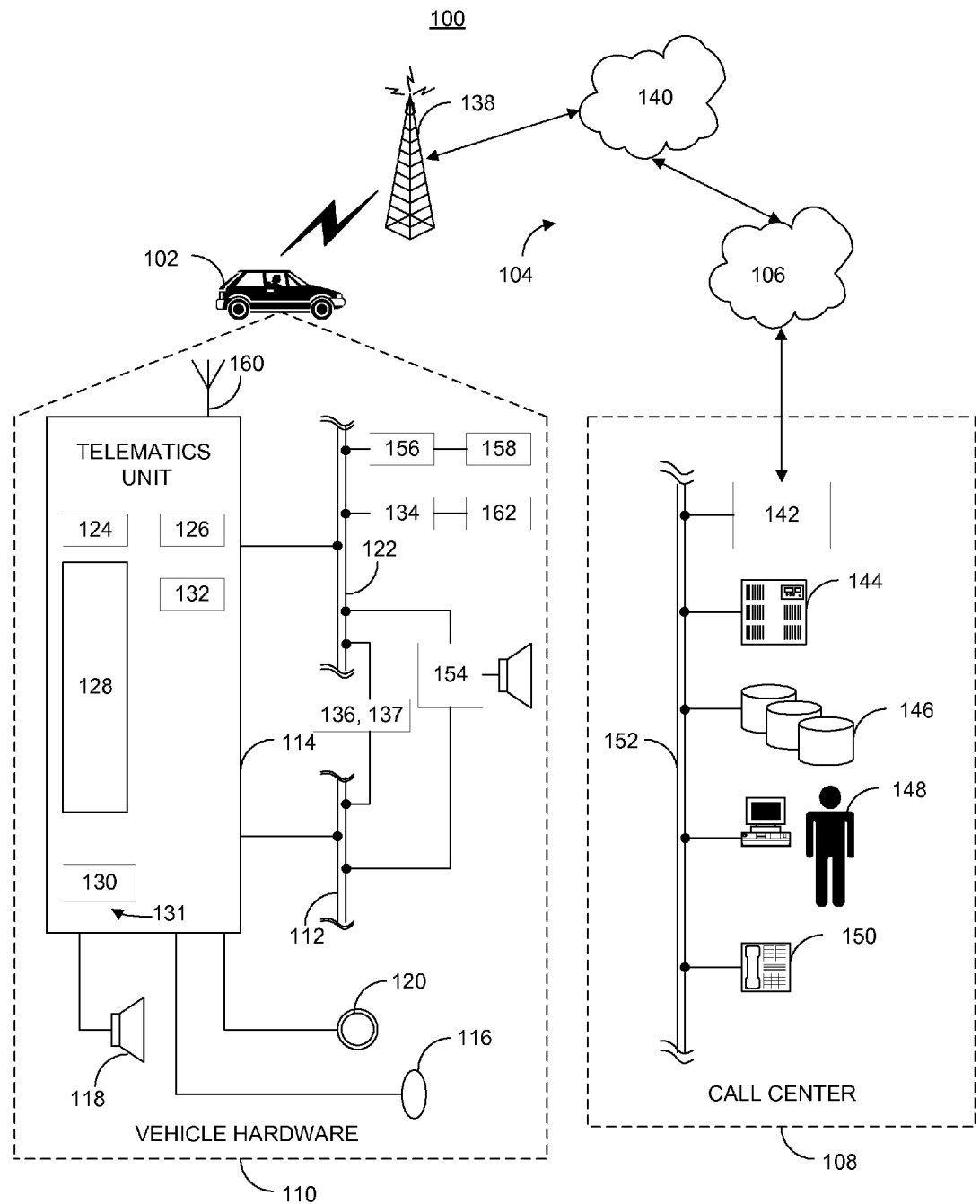
FIG. 1 is a schematic diagram illustrating a system for delivery of in-vehicle telematics services, as contemplated by an example of the present invention.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100, however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128, one or more types of electronic memory 130 having stored thereon software 131, a cellular chipset/component 124, a wireless modem 126, an antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, videogames and/or other content is downloaded by an infotainment center 136 operatively connected to the telematics unit 114 via vehicle bus 122 and audio bus 112. In one example, downloaded content is stored for current or later playback. The infotainment center 136 further includes a satellite radio receiver 137, such as an XM radio receiver capable of demodulating both satellite and terrestrial XM radio service frequencies.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 will include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. In one example, the antenna 160 is a dual mode antenna that services the GPS chipset/component and the cellular chipset/component. In yet other examples, the antenna 160 further includes a satellite radio antenna in the same or separate enclosure.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push-button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Examples vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber of other optical network, a cable network, other wireless networks such as wireless local networks (WLANs) or networks providing broadband wireless access (BWA), or any combination thereof.

Call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
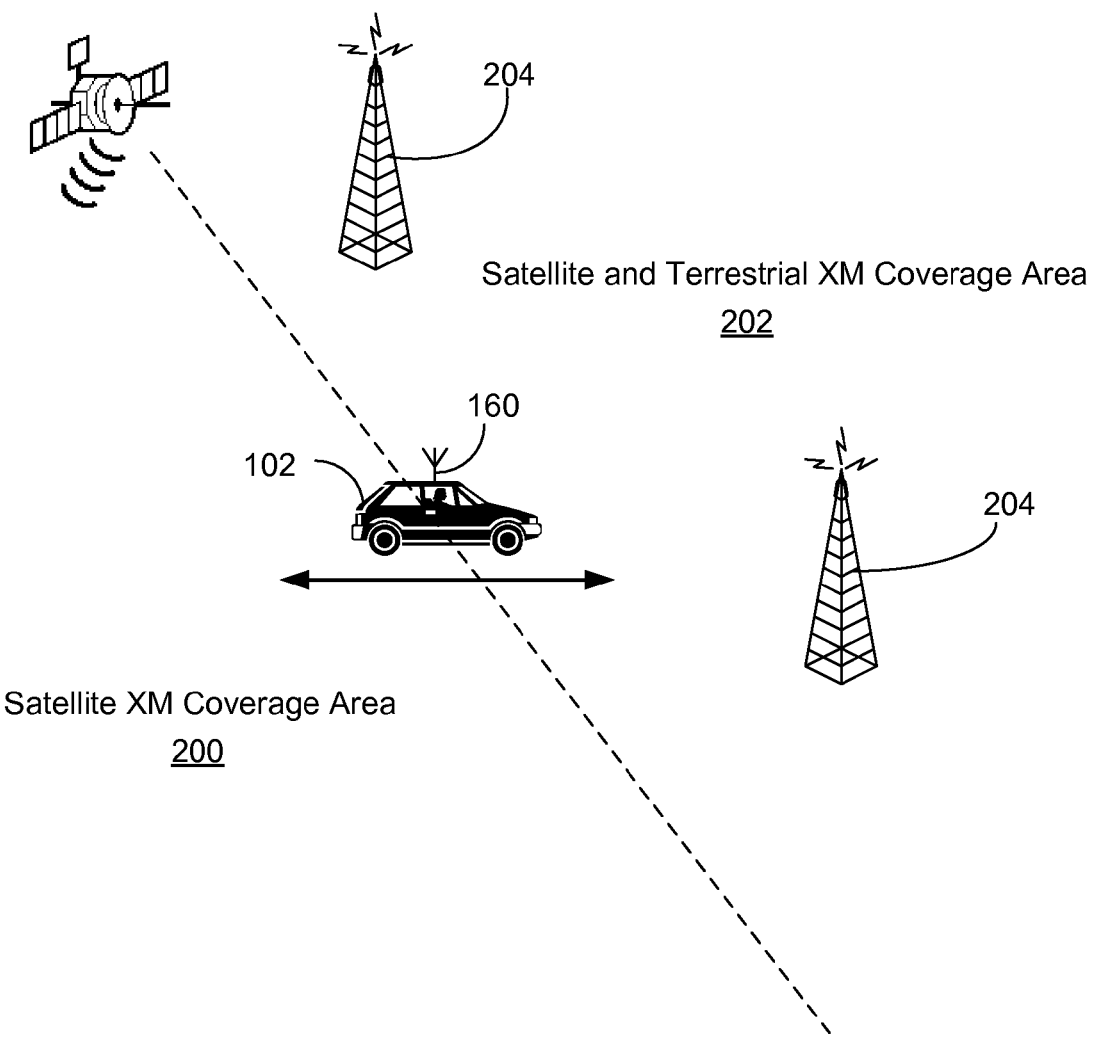
FIG. 2 is a schematic diagram of geographical satellite service areas, in accordance with an example of the present invention.

As illustrated in FIG. 2, in the course of receiving the satellite radio transmission, the vehicle 102 moves between a geographical area 200, where the satellite service is delivered only via XM satellite coverage, and an area 202, where the satellite signal is supplemented by terrestrial XM service coverage. To minimize the possibility of adjacent channel interference between terrestrial and satellite based XM signals, the satellite receiver 137 decreases the amplification of XM satellite band frequencies when the vehicle 102 enters or approaches the satellite/terrestrial coverage area 202. Conversely, when the vehicle 102 moves into a satellite only area 200, the satellite receiver 137 increases the amplification of XM satellite band frequencies to effectively extend the satellite only coverage area, thereby also decreasing the need for additional terrestrial XM repeaters 204, as well as reducing the system cost and maintenance expenses.

Figure 3:
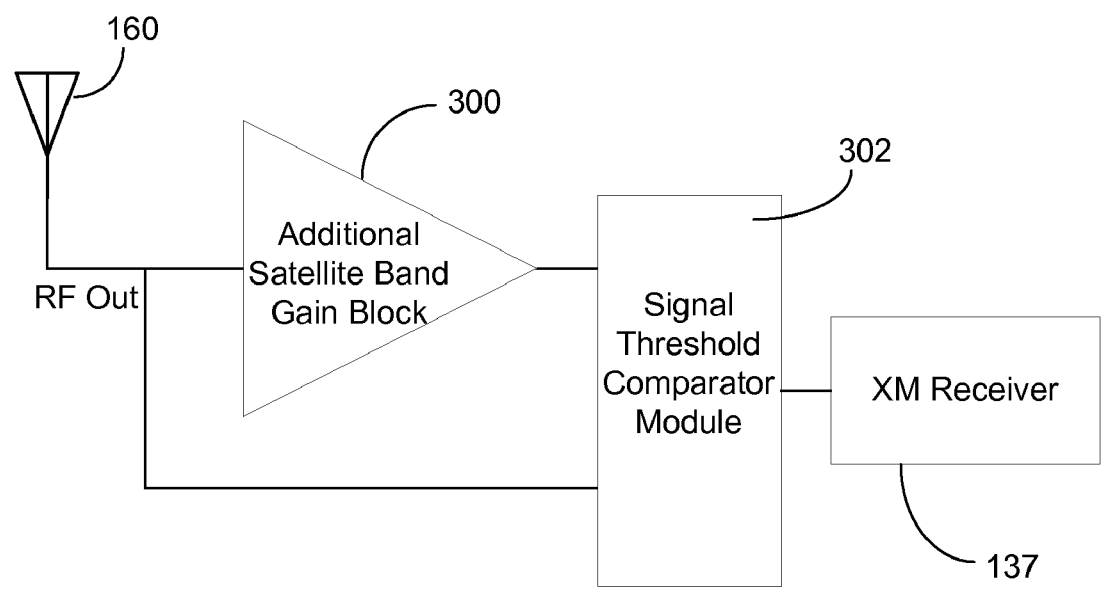
FIG. 3 is a schematic diagram of a system for dynamically controlling adjacent channel interference between satellite and terrestrial based signals while enhancing the satellite reception in areas not covered by the terrestrial repeater network of FIG. 2, in accordance with an example of the present invention.

Turning to FIG. 3, to implement the variable amplification of XM satellite frequencies, the radio frequency (RF) output of satellite service antenna 160 is connected to an additional XM satellite frequency gain block 300 and a signal threshold comparator module 302. In one example, the additional XM satellite frequency gain block 300 is part of a low noise amplifier (LNA) that enhances the modulated RF output of the XM antenna 160. In another example, the additional XM satellite frequency gain block 300 and/or the signal threshold comparator module 302 are part of the satellite receiver 137. In yet another example, the signal threshold comparator module 302 is implemented via computer executable instructions stored in memory of the satellite receiver 137. The signal threshold comparator module 302 continuously monitors terrestrial XM frequencies to determine whether the vehicle 102 is approaching coverage area 202 where XM satellite signal is supplemented by XM terrestrial repeaters 204 (e.g., in an urban environment where building blockage requires terrestrial repeater coverage). Preferably, the signal threshold comparator module 302 monitors the bit error rate (BER) of the terrestrial XM signal to determine the presence of terrestrial XM coverage. For example, when BER of the terrestrial XM signal begins to drop below one hundred (100) percent and/or reaches a predetermined threshold (e.g., below fifty (50) percent), indicative of potential presence of XM terrestrial coverage, the signal threshold comparator module 302 turns off the additional XM satellite frequency gain block 300 to avoid adjacent channel interference. If, however, XM terrestrial signal BER is at a 100 percent (i.e., XM terrestrial signal is absent) or stays above the predetermined threshold BER (e.g., above 50 percent), indicating a low terrestrial signal level, the signal threshold comparator module 302 applies additional amplification to the XM satellite signal by activating the additional XM satellite frequency gain block 300 to enhance satellite coverage.

In another example, the signal threshold comparator module 302 monitors received signal strength (RSSI) of XM terrestrial signal against a predetermined terrestrial XM RSSI threshold to control the additional XM satellite gain block 300 based on the presence of XM terrestrial coverage.

Turning to FIG. 4, an example of a method for enhancing XM satellite coverage is shown. In step 400, the signal threshold comparator module 302 continuously reads or monitors the BER of the terrestrial XM signal. In step 402, when the terrestrial signal BER is greater than a predetermined threshold (e.g., greater than 50 percent, thereby indicating an absence of terrestrial signal), the signal threshold comparator module 302 applies the additional XM satellite gain to the RF output of the antenna 160 to enhance and expand the satellite coverage area. However, to reduce the possibility of adjacent channel interference from terrestrial XM repeaters 204 (FIG. 2), the signal threshold comparison module turns off additional XM gain block 300 when the vehicle 102 leaves the satellite only coverage area (e.g. when terrestrial signal BER falls below the predetermined threshold).

Those skilled in the art will appreciate that the foregoing description generally applies to enhancing any other satellite service that is supplemented by a terrestrial repeater network having potential for interference with satellite frequencies (e.g., enhancing SIRIUS satellite radio coverage).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for enhancing coverage for a mobile satellite service, the system comprising:
   a signal threshold comparator module for monitoring a predetermined threshold for a satellite service signal received on a first frequency band, wherein the threshold is a predetermined bit error rate of the signal on the first frequency band;
   a signal gain block operable to vary amplification of the satellite service signal received on a second frequency band in response to the monitoring, wherein the signal gain block increases amplification of the signal received on the second frequency band when a bit error rate of the signal received on the first frequency band exceeds the threshold, and otherwise decreases amplification of the signal received on the second frequency band; and
   a satellite receiver for decoding the satellite service signal received on the first and second frequency bands.

2. The system of claim 1 wherein the mobile satellite service is a satellite radio service.

3. The system of claim 1 wherein the first frequency band comprises frequencies for receiving satellite radio signals from one or more terrestrial satellite repeaters.

4. The system of claim 1 wherein the second frequency band comprises frequencies for receiving satellite radio signals from one or more satellites.

5. The system of claim 1 wherein the threshold is a predetermined signal strength level of the satellite service signal received on the first frequency band.

6. A method for enhancing coverage for a mobile satellite service, the method comprising:
   monitoring a predetermined threshold for a satellite service signal received on a first frequency band, wherein the threshold is a predetermined bit error rate of the signal on the first frequency band;
   in response to the monitoring, varying amplification of the satellite service signal received on a second frequency band by increasing amplification of the signal received on the second frequency band when a bit error rate of the signal received on the first frequency band is greater than the threshold, and otherwise decreasing amplification of the signal received on the second frequency band; and
   decoding the satellite service signal received on the first and second frequency bands.

7. The method of claim 6 wherein the mobile satellite service is a satellite radio service.

8. The method of claim 6 wherein the first frequency band comprises frequencies for receiving satellite radio signals from one or more terrestrial satellite repeaters.

9. The method of claim 6 wherein the second frequency band comprises frequencies for receiving satellite radio signals from one or more satellites.

10. The method of claim 6 wherein the threshold is a predetermined signal strength level of the satellite service signal received on the first frequency band.

11. A non-transitory computer readable medium having stored thereon computer executable instructions for enhancing coverage for a mobile satellite service, the instructions comprising:
    monitoring a predetermined threshold for a satellite service signal received on a first frequency band, wherein the threshold is a predetermined bit error rate of the signal on the first frequency band;
    in response to the monitoring, varying amplification of the satellite service signal received on a second frequency band by increasing amplification of the signal received on the second frequency band when a bit error rate of the signal received on the first frequency band is greater than the threshold, and otherwise decreasing amplification of the signal received on the second frequency band; and
    decoding the satellite service signal received on the first and second frequency bands.

12. The non-transitory computer readable medium of claim 11 wherein the mobile satellite service is a satellite radio service.

13. The non-transitory computer readable medium of claim 11 wherein the first frequency band comprises frequencies for receiving satellite radio signals from one or more terrestrial satellite repeaters.

14. The non-transitory computer readable medium of claim 11 wherein the second frequency band comprises frequencies for receiving satellite radio signals from one or more satellites.

* * * * *